June 25, 1963   G. STOLAR ETAL   3,095,537
PERMANENT MAGNET ELECTRICAL INSTRUMENT WITH FLUX GAP ADJUSTMENT
Filed May 5, 1960   3 Sheets-Sheet 1

GERALD STOLAR
BERNARD P. GROPP
JOHN W. HIGLEY
INVENTORS

BY
Rudolph J. Junck
ATTORNEY

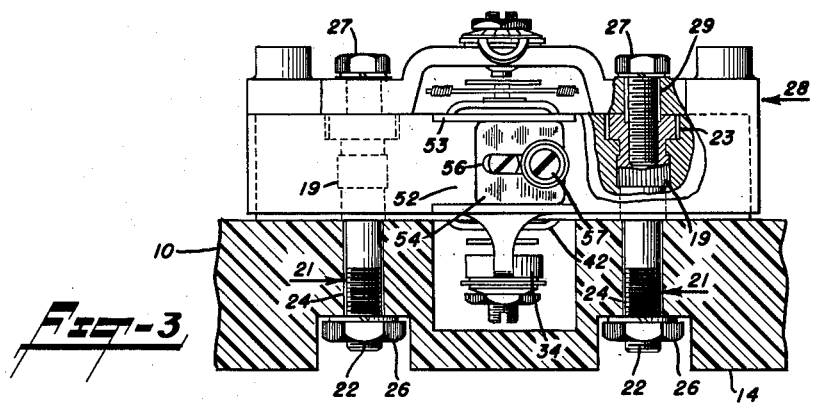
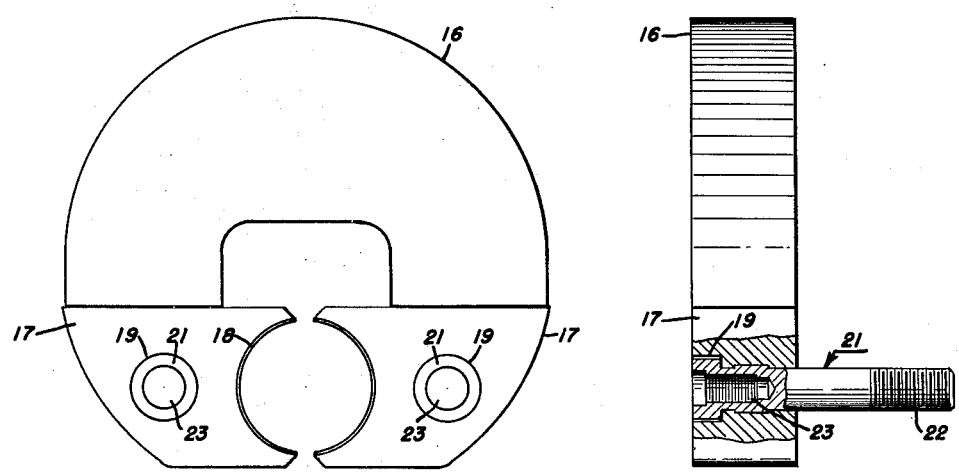
GERALD STOLAR
BERNARD P. GROPP
JOHN W. HIGLEY
        INVENTORS
BY
      ATTORNEY June 25, 1963 G. STOLAR ETAL 3,095,537
PERMANENT MAGNET ELECTRICAL INSTRUMENT WITH FLUX GAP ADJUSTMENT
Filed May 5, 1960 3 Sheets-Sheet 3
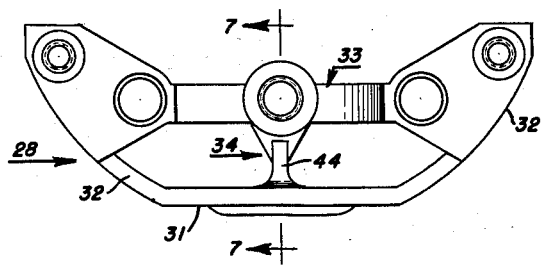
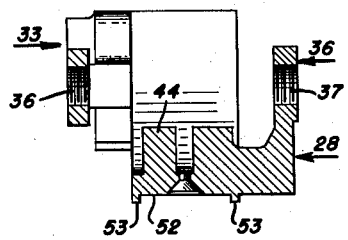
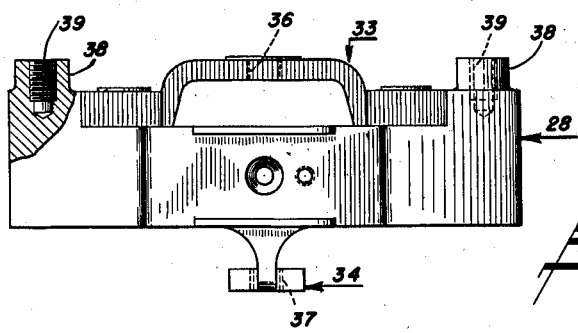
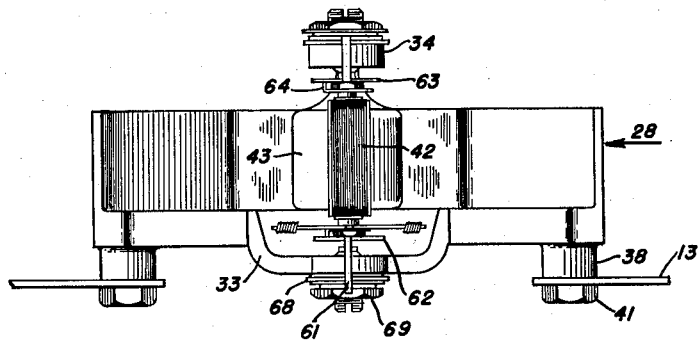
GERALD STOLAR
BERNARD P. GROPP
JOHN W. HIGLEY
INVENTORS
BY
Rudolph J. Jurick
ATTORNEY

United States Patent Office 3,095,537
Patented June 25, 1963

3,095,537
PERMANENT MAGNET ELECTRICAL INSTRUMENT WITH FLUX GAP ADJUSTMENT
Gerald Stolar, Linden, Bernard P. Gropp, Irvington, and John W. Higley, Glen Ridge, N.J., assignors, by mesne assignments, to Daystrom, Incorporated, Murray Hill, N.J., a corporation of Texas
Filed May 5, 1960, Ser. No. 27,185
2 Claims. (Cl. 324—151)

This invention relates to an electrical instrument and more particularly to a moving coil electrical instrument of the external magnet type.

Instruments of the class contemplated by this invention comprise a generally U-shaped permanent magnet having a pair of pole pieces secured thereto. A soft iron core is mounted between the pole pieces and is spaced therefrom to form a pair of magnetic flux gaps; one flux gap with each pole piece. A wire wound movable coil is pivotally mounted for rotation in the flux gaps, the angle through which the coil rotates varying with the magnitude of the coil current. Instruments of this type wherein both sides of the wire turns of the movable coil operate within a flux gap are known as double air gap, permanent magnet movable coil instruments.

The coil is provided with axially aligned staffs which are pivotally carried in bearings supported in bearing supporting members, or brackets, adjacent the opposite ends of the core. The bearing supporting members in the instrument of our invention comprise an integral part of a movement bracket to which the core is secured. Novel keying and doweling means are provided whereby the core is accurately located on the said movement bracket.

In the assembly of the instrument, the core and jewel bearings are secured to the movement bracket and the movable coil is then rotatably mounted within the said jewel bearings. The usual spiral hair springs and associated parts are secured thereto. The resultant sub-assembly is easily inspected and the necessary adjustments made thereto prior to mounting the same on the magnet and attached pole pieces. With most prior art instruments, the movable mechanism must be located between the pole pieces in the assembly of the instruments whereby inspection is hampered and adjustments made difficult by the surrounding magnet and pole piece structure.

The above described sub-assembly comprising the movement bracket, core and movable mechanism including the coil is secured to the assembled magnet and pole piece structure in such a manner such that relative movement between the movement bracket and magnet in any direction in a plane normal to the instrument axis is possible whereby the core is shiftable with respect to the pole piece bore to change the radial flux gap for adjustment of scale tracking accuracy. The instrument scale plate is mounted on the movement bracket with the fiducial center of the scale markings coaxially positioned with the pivot axis of the movable coil, and such coaxial arrangement is not disturbed upon shifting of the movement bracket and attached core with respect to the pole pieces. Further, the movement bracket has a channel formed thereon within which a magnet shunt is mounted. A tapped hole in the bracket receives a screw for securing the shunt to the bracket, the screw extending through an elongated hole in the shunt for adjustment thereof.

An object of this invention is the provision of an instrument mechanism which is of a simple design and in which the component parts thereof are inexpensively manufactured and easily adjusted.

An object of this invention is the provision of an external magnet mechanism which includes a movement bracket having bearing supporting members integrally formed thereon, a core of magnetic material secured to the movement bracket, and releasable fastening means securing the movement bracket to the magnet and pole piece assembly, the said movement bracket being shiftable in a plane normal to the instrument axis to thereby adjustably position the core with respect to the pole pieces when the said fastening means is released.

An object of this invention is the provision of a movement bracket for use on the magnetic system of an instrument which bracket has formed thereon a channel for the support of a magnetic shunt, the said shunt being adjustably positioned along the channel upon release of the fastening means securing the shunt to the bracket.

An object of this invention is the provision of a novel fastening means for securely fastening and accurately positioning a core to a bracket which bracket includes a key formed thereon, a cooperating key way formed in the core, and a threaded bolt having a cylindrical section which snugly fits cooperating apertures in the movement bracket and core.

These and other objects and advantages will become apparent from the following description when taken with the accompanying drawings. It will be understood, however, that the drawings are for purposes of illustration and are not to be construed as defining the scope or limits of the invention, reference being had for the latter purpose to the appended claims.

In the drawings wherein like reference characters denote like parts in the several views:

FIGURE 3 is a side view of the instrument as seen from the lower side of FIGURE 1, parts being shown broken away for clarity;

FIGURE 4 is a front view of the magnet and pole pieces;

FIGURE 5 is a side view, with parts broken away for clarity, of the magnet and attached pole pieces and showing mounting studs press-fitted into the pole pieces;

FIGURE 6 is a top plan view of the movement bracket;

FIGURE 7 is a sectional view taken on line 7—7 of FIGURE 6;

FIGURE 8 is a side view of the movement bracket; and

FIGURE 9 is a side view showing the core and moving mechanism secured to the movement bracket prior to attachment thereof to the magnet.

Figures 1, 2:
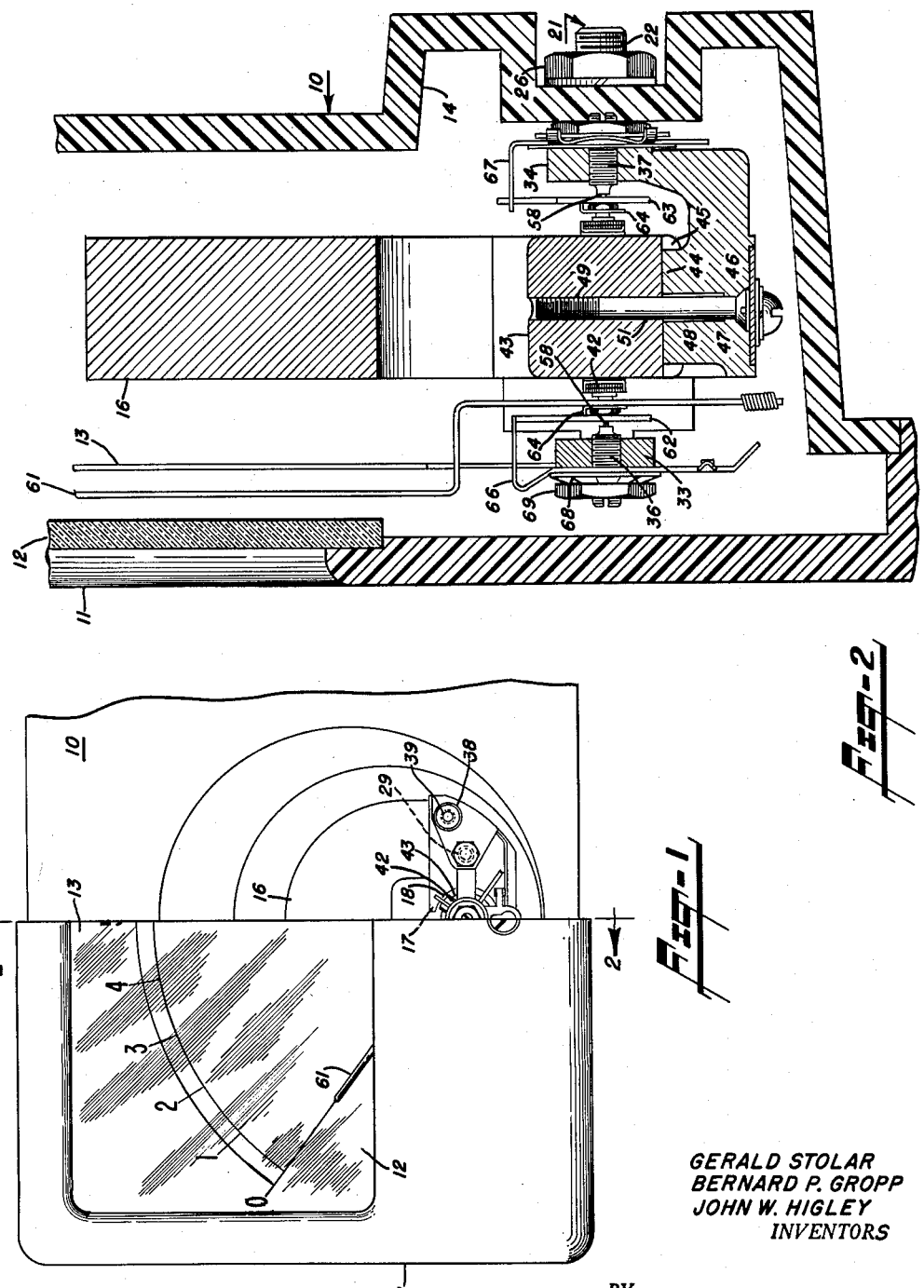
FIGURE 1 is a top plan view of an instrument mechanism embodying our invention and showing the scale plate and case broken away for clarity.
FIGURE 2 is a vertical sectional view taken substantially along line 2—2 of FIGURE 1.

Reference is first made to FIGURES 1–3 wherein an instrument casing, or housing, comprising a case 10, made of suitable plastic, and a cover 11, are shown. A transparent window 12 closes the front of the instrument, through which window the entire operating range of a calibrated scale carried by a scale plate 13 is visible. The case 10 includes a recessed portion 14 for accommodating the novel instrument mechanism of our invention.

The instrument mechanism includes a magnetic structure comprising a generally U-shaped permanent magnet 16 having a pair of pole pieces 17, 17 secured thereto as by soldering, or other suitable means. The magnet may be magnetized, as indicated, for example, by the polar markings N and S shown in FIGURE 1. Although not shown in the drawings, it will be understood that in the manufacture of the instrument a single, solid blank pole piece may be first soldered to the magnet 16 to span the magnet poles. The pole piece bore 18 and mounting stud holes 19, 19 (FIGURE 4) are simultaneously machined for maximum consistency of location. Mounting studs 21, 21 are press fitted into the holes 19, 19

and scope of the invention as recited in the following claims.

We claim:
1. In an electrical instrument which includes a U-shaped magnet, pole pieces extending inwardly from the legs of the U-shaped magnet with shaped inner portions forming a pole piece bore and shaped outer portions, said pole pieces and magnet forming a substantially closed magnetic circuit, means fixedly securing the pole pieces to the magnet, an integral subassembly comprising:
   an integral movement bracket having two bridges and a core supporting structure formed thereon,
   pivot means mounted in said bridges,
   a cylindrical core mounted by the movement bracket such that the core axis substantially intersects the center points of said pivot means,
   and a coil surrounding the said core and pivotally mounted by the pivot means, a pointer fixed to the coil,
   said movement bracket having a cradle-shaped side portion which includes curved ends adapted to substantially cover the shaped outer portions of the pole pieces,
   the curved ends of the cradle-shaped side portion being spaced from the outer portions of the pole pieces thereby to permit relative movement therebetween in a plane substantially perpendicular to the axis of the core,
   one of said bridges spanning substantially only the curved ends of the mounting bracket, thereby to permit greater angular movement of said pointer,
   the other one of said bridges being of the cantilever type extending from the center of said cradle shaped side portion,
   the said subassembly being attached to the pole pieces of the instrument by insertion of the cantilever bridge through the pole piece bore to position the said core and coil between the pole pieces,
   said one bridge having holes formed therein, said pole pieces having tapped holes formed therein,
   and means including screws of smaller diameter than the holes through the movement bracket and extending therethrough to threadedly engage the tapped holes, the clearance between the movement bracket holes and screws and between the outer portions of the pole pieces and movement bracket permitting positional adjustment of the movement bracket on the pole pieces, thereby to permit adjustment of said core in all directions in a plane normal to the core axis.

2. The electrical instrument set forth in claim 1 wherein said one bridge has tapped bosses integrally formed thereon and tapped holes in said bosses,
   a scale plate secured to the movement bracket by screws which engage said last named tapped holes, thereby accurately locating the fiducial center of the scale coaxially with the core axis regardless of the location of the movement bracket with respect to the magnet and attached pole pieces.

References Cited in the file of this patent

UNITED STATES PATENTS

| | | |
|---|---|---|
| 1,962,855 | Beede | June 12, 1934 |
| 2,887,656 | Barry | May 19, 1959 |
| 2,973,480 | Clark | Feb. 28, 1961 |

FOREIGN PATENTS

| | | |
|---|---|---|
| 122,489 | Australia | Oct. 31, 1946 |
| 290,445 | Great Britain | May 17, 1928 |
| 447,051 | Great Britain | May 5, 1936 |
| 542,454 | Great Britain | Jan. 9, 1942 |